United States Patent [19]

Wicker

[11] 4,143,967

[45] Mar. 13, 1979

[54] LATENT PHOTO SYSTEM

[75] Inventor: Ralph C. Wicker, Rush, N.Y.

[73] Assignee: Benjamin J. Haggquist, Fairport, N.Y. ; a part interest

[21] Appl. No.: 910,639

[22] Filed: May 30, 1978

Related U.S. Application Data

[63] Continuation-in-part of Ser. No. 710,300, Jul. 30, 1976, abandoned.

[51] Int. Cl.[2] .................... G03B 27/32; B41M 1/14; B42D 15/00; G03B 27/68

[52] U.S. Cl. .................... 355/77; 101/211; 283/6; 355/52; 355/71

[58] Field of Search .................... 101/211; 283/6, 7, 8 B; 355/52, 77, 71

[56] References Cited

U.S. PATENT DOCUMENTS

| | | | |
|---|---|---|---|
| 1,285,753 | 11/1918 | Löwenstein | 283/6 UX |
| 1,762,711 | 6/1930 | Casto | 101/211 |
| 2,798,428 | 7/1957 | Tollenaar | 101/211 |
| 2,952,080 | 9/1960 | Avakian et al. | 283/6 UX |
| 3,048,697 | 8/1962 | Cavanaugh et al. | 283/6 UX |
| 3,109,239 | 11/1963 | Wicker et al. | 101/211 X |
| 3,609,035 | 9/1971 | Ataka | 355/77 X |
| 3,640,009 | 2/1972 | Komiyama | 283/7 X |
| 3,675,948 | 7/1972 | Wicker | 283/6 |

*Primary Examiner*—Richard A. Wintercorn
*Attorney, Agent, or Firm*—Shlesinger, Fitzsimmons & Shlesinger

[57] ABSTRACT

A method of producing a latent photograph by using a reproduction of the photograph in both negative and positive form, photographing both negative and positive in sequence and in register through a dark screen, having extremely small apertures and angled 30° and 60° in respect to the upper margin, the resulting latent photograph having a visual effect of being smooth and continuous is a reflection of the size and shape of the dots, lines, or tones, of both positive and negative reproductions, but reduced in size and changed in shape by the small apertures of the dark screen when photographed at two angles 30° apart through the negative and positive reproductions; the latent photographs reflect only the positive end of the photographic scale and then only in percentages of from 1/10 of a percent to 5 percent representing the dots, lines, or tones of the positive and negative reproductions which varied in percentages of from 1% to 59% being positive in nature and from 60% to 99% being negative in nature; the visible tonal range of the latent photographs are rendered invisible or latent in form by the cancellation effect of the negative and positive dots, tones, or lines photographed next to or 30° from each other; to view or see the latent photographs negative or positive, the dark screen is placed over the latent picture and turned to the appropriate angle, producing a visible photo of the negative in one case and a visible photo of the positive in the other; the visible photographs are a reflective match of the original reproductions, when in reality the dots, lines, or tones on the original reproductions, had both negative and positive aspects, with percentages of from 1% to 99% whereas the combination of the latent photograph and the dark screen reflects only negative aspects with percentages of from 95% to 99 9/10%.

18 Claims, 18 Drawing Figures

LATENT PHOTO SYSTEM

The present invention is a continuation-in-part of my copending application Ser. No. 710,300, filed July 30, 1976, now abandoned. It relates to the art of printing or lithography and more particularly to a method of producing an invisible photograph, latent in form, by the use of a dark screen, and a method of viewing the photograph either by utilizing the same dark screen, or by making a print of the photograph by an offset printing process, and then reproducing the print by a xerographic process or the like.

The technique of halftone photography is well known in the printing art. It consists of employing an offset camera, a halftone screen, and suitable light sensitive film for accepting the image. The offset camera is equipped with a copyboard, and suitable lighting and lens to reflect the tonal values of the photograph through the halftone screen and onto the light sensitive film. The halftone screen may have regularly arranged dots, tones, or lines; each dot, tone, or line having a dark center and a lighter outer shape to allow the light or dark tone of the original photograph to reflect a given dot, positive 1% to 59% and negative 60% to 99% on the light sensitive film. The halftone screen is normally arranged at an angle relative to the upper margin of the photograph, the angle of 45° normally is used when photographing black and white pictures due to the angle of incidence of the dots in relation to the upper margin of the photograph. The dots, tones, or lines of the halftone screen may be arranged randomly to produce different effects in the final printing, therefore no specific angle is needed for the printing process. Angles of 75°, 105° or 90° can be used depending on whether the halftone is being overprinted with other screens, or in the case of a color photograph all four angles may be used to produce four separate halftone negatives.

The use of 30° angles between halftones produces a pleasing effect called a rosette. However, minor errors in angulation of 1° or 2° can produce unwanted patterns called moirés. The term rosette then can be applied to the displacement of 30° between angles of two or more halftone screens, whereas when the angles are more or less than the 30° displacement the effect would produce a moiré. Reproductions of photographs may be produced using a process called continuous tone printing. The original photograph is reproduced on a special continuous tone film containing no dots or lines, therefore no angle is possible or needed for reproduction. A special grained printing plate converts the continuous tone image to a random halftone for printing. A reproduction of a photograph then can be accomplished by either a random, halftone, or continuous tone process. A latent or invisible photograph can be produced by using a reproduction made from any of the three above processes. The reproduction process described in the present invention will be geometric or halftone in nature.

In Wicker U.S. Pat. No. 3,675,948 and Wicker U.S. Pat. No. 3,784,289 A Printing Method and Article For Hiding Halftone Images and A Method And Apparatus For Hiding and Viewing Halftone Images; a method is described which permits an image to be hidden in a printed halftone field, using a screen which can have openings of about 40% in value to hide a negative of an image by exposing the negative through a screen onto a new film, a second exposure is made using the positive of the negative image and the dark screen which is angled 30° from the angle of the negative screen in respect to the upper margin of the image. The screen is placed in contact and register with the positive image and an exposure is made onto a new film. After development the negative dots of about 40% opacity take on the exact shape of the original image and are disposed at an angle of 45°, and in the case of the positive the 40% opaque dots take on the reverse shape of the original image covering the background and meeting or joining the 40% dots of the negative image which are disposed at an angle of 75°. The image is hidden by the use of small halftone dots spaced at 100 lines or more per inch and the exact registration of the positive and negative images.

To view the hidden image a dark screen of 60% or more opacity is employed in a device or devices which is disposed above the image plane of the printed hidden image, a suitable light is transmitted or reflected through or onto the dark screen and the hidden image appears to blink when the screen is moved or vibrates over the surface of the image. This is accomplished by the use of a small vibrator motor in the devices. The movement of the screen was necessary because the alignment of the screen's minute openings and the 40% halftone dots in the hidden image had to coincide exactly with respect to each other. As the screen moved over the surface of the hidden image it caused a light interference effect or a misalignment between the 40% opaque dots and the minute openings of the screen. Normal expansion or contraction of printed surface could cause size changes of 0.002 to 0.005 of an inch, causing the misalignment problem to exist.

The use of a solid image, negative and positive, photographed through a screen at two separate angles produces an edging effect at the point where the two angles of the negative and positive images intersect, which can cause the shape of the hidden image to be partially visible. The movement of the screen over the hidden image can have the effect of seeing the image as partially black or partially white. It is the intent of the present invention to show a method of hiding reproductions of original photographs which will eliminate the edging effect caused by the solid images of the negative and positive, and a viewing screen which eliminates the need for moving or vibrating the screen over the surface of the hidden photograph.

The present invention describes a new method of halftone photography utilizing an extremely dark screen to produce a halftone with micro-miniatureized positive dots which contain a negative and positive halftone image separated by the difference of 30°, rendering the visible halftones invisible or latent.

To view the hidden image, a dark screen of similar periodicity, having apertures much smaller than the smallest micro-dot, is placed over the film and turned to the positive angle, the emerging picture retains the reflective aspects of the original positive halftone while the dark viewing screen isolates the negative halftone, due to the 30° angle difference.

Still another way of viewing the hidden image is to make an offset print thereof, and then reproduce the print by way of a xerographic reproduction process, or the like. Although the image is hidden in the offset print, the process of reproducing the print through a lens causes the latent image to become visible on the "reproduction" of the print.

It will be understood to those familiar with the art that a photograph which is invisible until combined with a dark screen can be an effective and positive system of personal identification.

The fabrication of the dark screen can be of unique pattern with lines per inch variable over the image area, preventing any known method of original duplication. This combined with wide tonal differences between individuals would render any counterfeiting by photography or altering useless.

The above and other novel features of the invention will become more readily apparent with the following description of the drawings.

Figure 1:
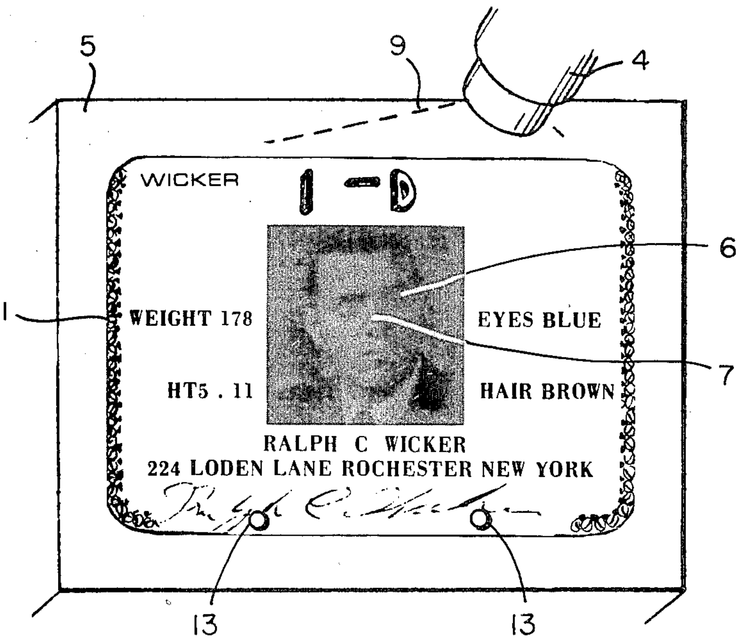
FIG. 1 is an overhead view of the original photograph and copy mounted for exposure in an offset camera.
Figure 2:
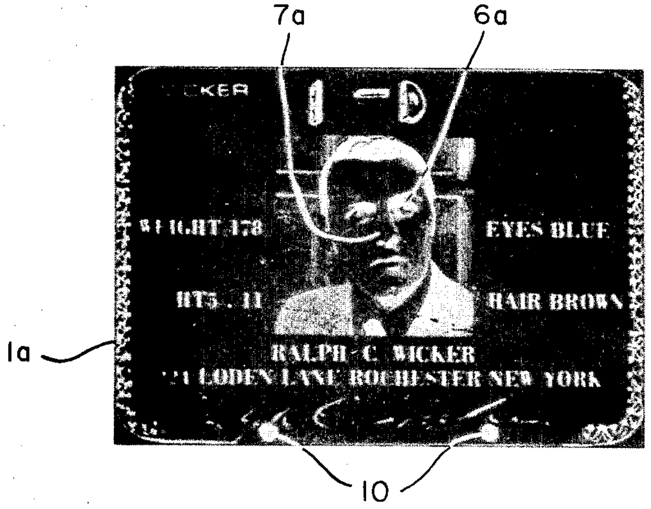
FIG. 2 illustrates the negative halftone produced by the camera after exposure through a contact halftone screen.

Referring to FIG. 1 an original photograph continuous in form is mounted in the copyboard 5 of an offset camera. The photograph or copy contains dark shadows 6 and light highlights 7 which will be shown and followed throughout the drawings and descriptions. At the lower center of the copy 1, two punched holes 10 are registered and secured by two register pins 13 which project from copyboard 5. Now with the copy in position the camera lamp 4 is turned on reflecting light 9 off the copy 1 through a suitable lens, directing the dark and light tones of the copy through a vignetted halftone screen and onto a new film. The new film is now developed producing the halftone negative as shown in FIG. 2, wherein the photo portion of the negative halftone is indicated at 1*a* while the highlight dots of the negative are indicated at 6*a* and the shadow dots of the negative are indicated at 7*a*.

Figure 2A:
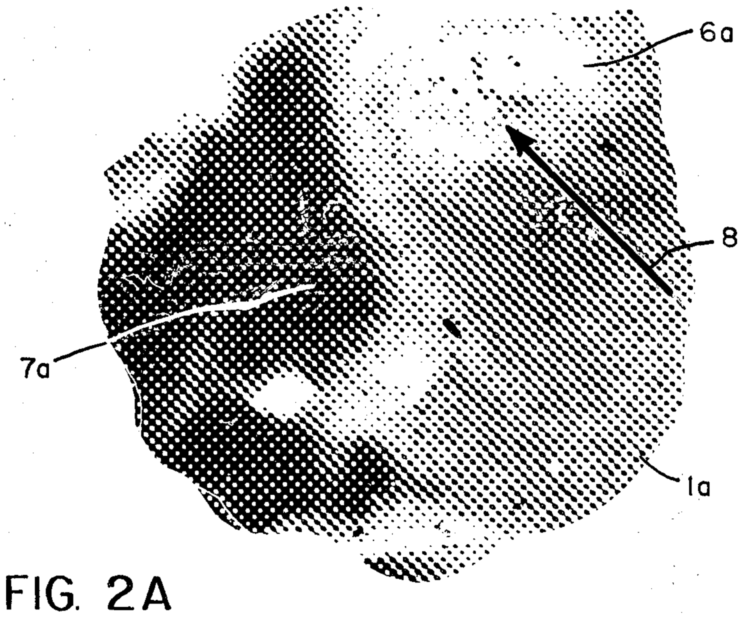
FIG. 2A is an enlarged section of the halftone negative in FIG. 2 illustrating the halftone pattern and the angular direction of the rows of dots forming the halftone.
Figure 3:
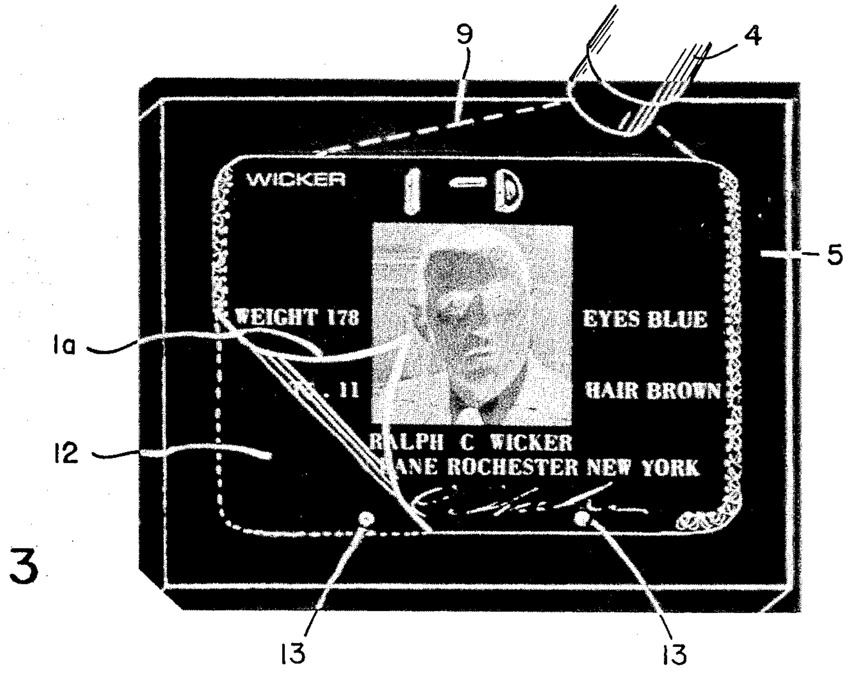
FIG. 3 is an overhead view of a contact frame containing the negative in FIG. 2 and a new film in register ready for exposure.
Figure 3A:
FIG. 3A illustrates the positive halftone produced after exposure and development of the new film in FIG. 3.
Figure 3B:
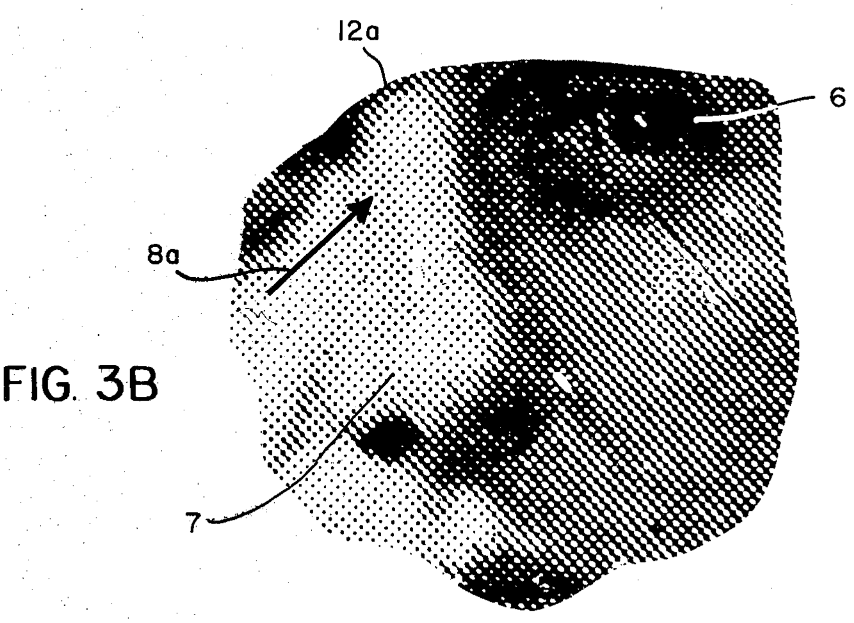
FIG. 3B is an enlarged section of the halftone in FIG. 3A indicating the angle of its rows of halftone dots, which are opposite in contrast to those shown in the negative in FIG. 2A.

This is better illustrated in FIG. 2A which shows an enlargement of the light and dark halftone dots, and the direction of the rows of dots in relation to the upper edge of the negative. The negative is now prepared for contact and is mounted as shown in FIG. 3 in the frame 5 which contains a new piece of light sensitive film 12, which has two punched holes for receiving the two register pins 13. A vacuum frame is now turned on securing the negative to the new film in known manner, and the exposure is now made using the lamp 5 to transfer the image of the negative halftone 1*a* to the new film 12. The film 12 is now developed and processed to produce the positive halftone 12*a* as shown in FIG. 3A, the positive halftone being the direct opposite, as far as dark shadows and highlights are concerned, as the negative. This halftone is shown enlarged in FIG. 3B, and areas 6 and 7 are seen to be the direct opposite of areas 6*a* and 7*a* shown in FIG. 2A. The negative halftone 1*a* and the positive halftone 12*a* can now be used to produce the latent photograph as shown in FIG. 8B.

Figure 4:
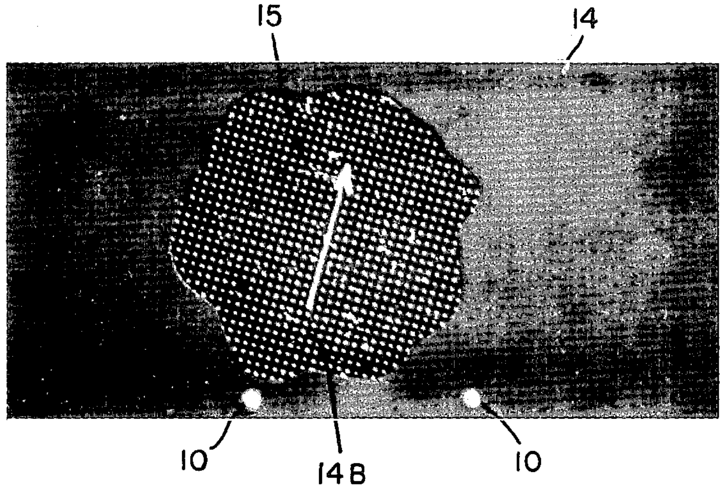
FIG. 4 is a print of the dark screen which may be used to create the latent halftone, with a section of the screen enlarged to show the effective angle of the rows of its micro-openings when the dark screen is in one operating position.
Figure 5:
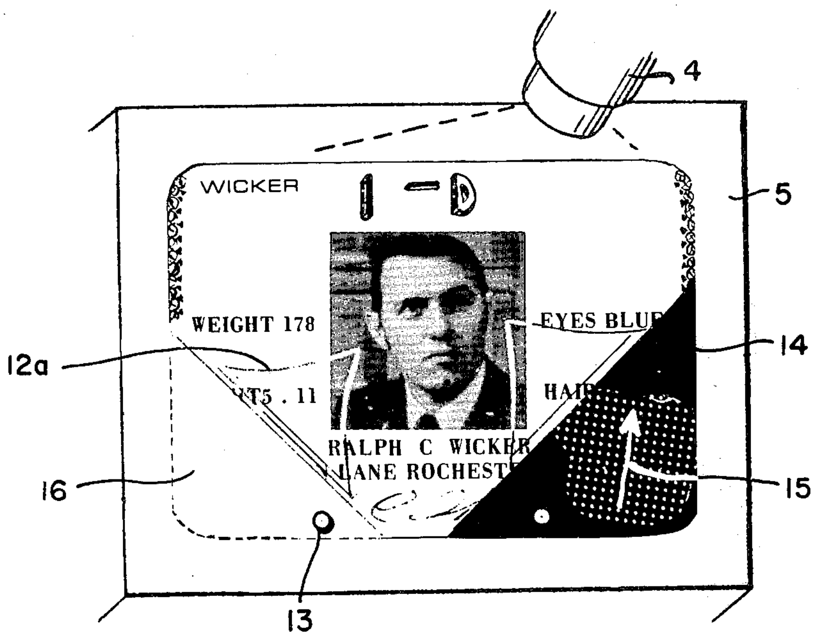
FIG. 5 is an overhead view of a contact frame containing the positive halftone shown in FIG. 3A in contact with the dark screen and a new film ready for the first exposure of the latent halftone.
Figure 6:
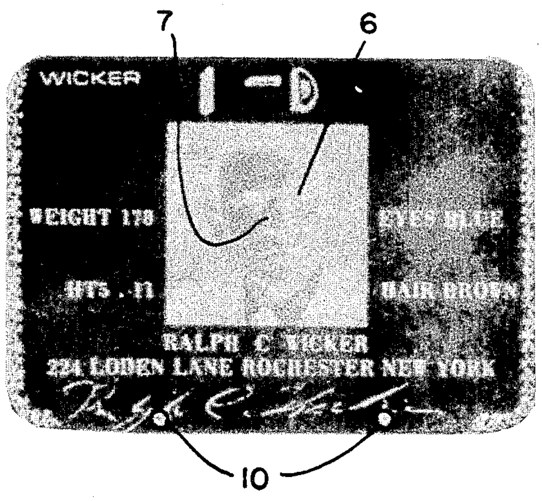
FIG. 6 is a view of the undeveloped latent negative produced from the positive halftone and the dark screen in FIG. 5.
Figure 6A:
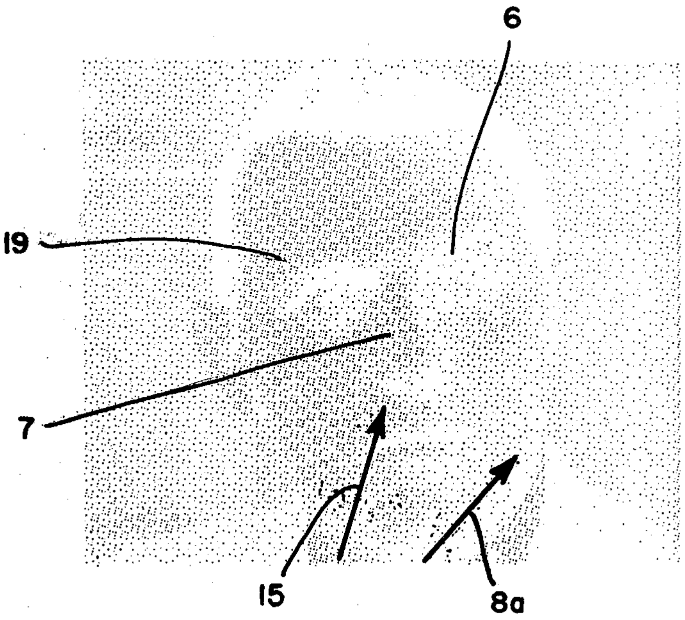
FIG. 6A illustrates an enlarged version of the undeveloped micro-dot image in FIG. 6 indicating the two angles in which the rows of dots representing the screen and the positive halftone extend and the resulting rosette pattern.

In FIG. 4, numeral 14 illustrates a dark screen having small openings which have been aligned at the angle of 105° as shown by arrow 15, in relationship to the axis of the screen. The screen 14 also has two punched holes 10 which represent the axis of the screen, and which are used to register the screen to the new film 16 beneath the positive halftone 12*a* as shown in FIG. 5. FIG. 5 is an overhead view of the contact frame containing the dark screen angled at 105° and the positive halftone 12*a*, both of which are held in register to the new film 16 using the punched holes 10 and the register pins 13. The vacuum pump is activated and the lamp 4 is turned on transmitting the image of the halftone dots through the small openings of the dark screen to the new film. The film 16 is left in position for a second exposure of the latent photograph. However to clearly understand the process, the drawing FIGS. 6 and 6A illustrate what the undeveloped latent negative image produced from the first exposure would look like if film 16 were to be developed at this stage. FIG. 6A is an enlarged version of FIG. 6 illustrating the dot patterns as shown in areas 6 and 7 which were produced from the positive and negative dots of 12*a* interfering with the dark screen 14. Arrow 8*a* indicates the angle from the positive in FIG. 3B and arrow 15 indicates the angle of the rows of openings in dark screen 14. Numeral 19 (FIG. 6A) illustrates the resulting rosette pattern from the 30° angular difference between 8a and 15.

Figure 6B:
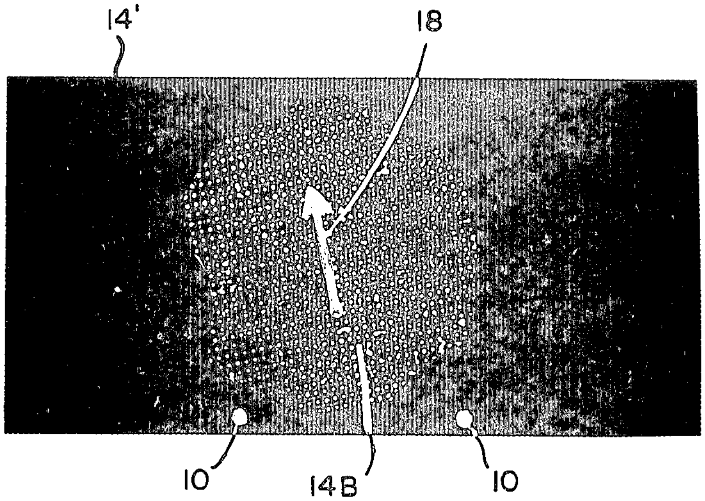
FIG. 6B is the same dark screen as shown in FIG. 4 turned to an operating position in which its rows of micro-openings are positioned at 75° for the second exposure of the latent halftone.
Figure 7:
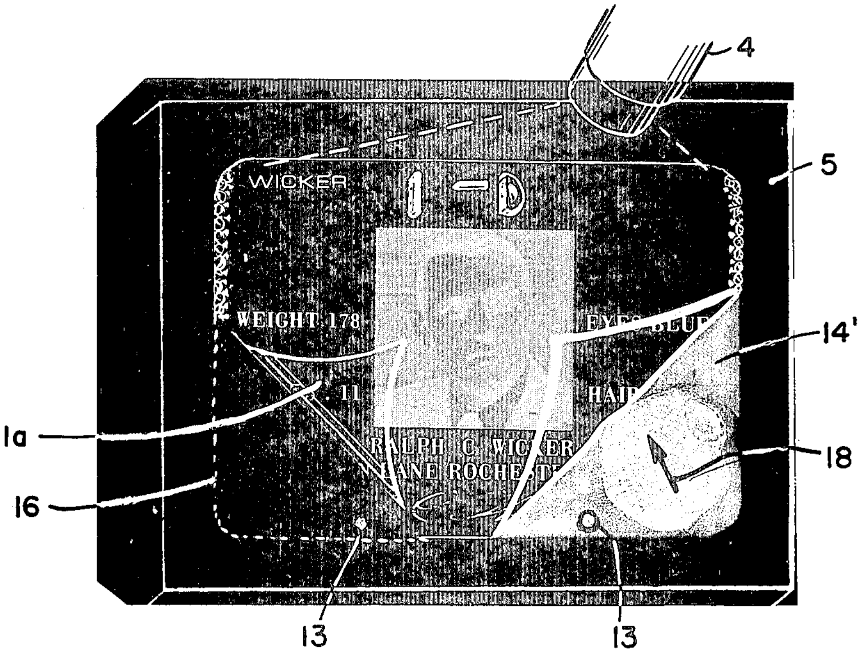
FIG. 7 is an overhead view of the contact frame, the negative halftone of FIG. 2 and the dark screen in register with the film used in FIG. 5.

The dark screen 14 is now prepared for the second exposure on the new film 16. FIG. 6B is a picture of the modified screen 14' cut with its axis extending at the angle of 75° to its rows of openings as indicated by arrow 18. Numeral 14B (FIG. 4) denotes an enlarged segment of the screen showing the small apertures of the screen. Numerals 10 and 13 indicate the means for registering the new film 16 as shown in FIG. 7. FIG. 7 is an overhead view of the contact frame 5 containing the new film 16 (once exposed) and dark screen 14', and the negative halftone 1a registered by holes 10 and secured by register pins 13. The dark screen 14' is displaced at the angle of 75° and is between the new film 16 and the negative halftone 1a. The vacuum pump is now activated and the lamp 4 is turned on transmitting the negative halftone dots of the negative 1a through the dark screem 14' to the new film 16. The second exposure is now completed and the film 16 is now ready for development.

Figure 7A:
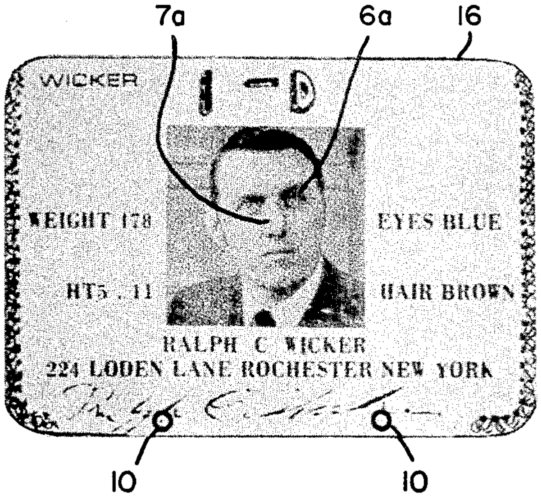
FIG. 7A is a view of the undeveloped latent positive produced from the negative and dark screen in FIG. 7.
Figure 7B:
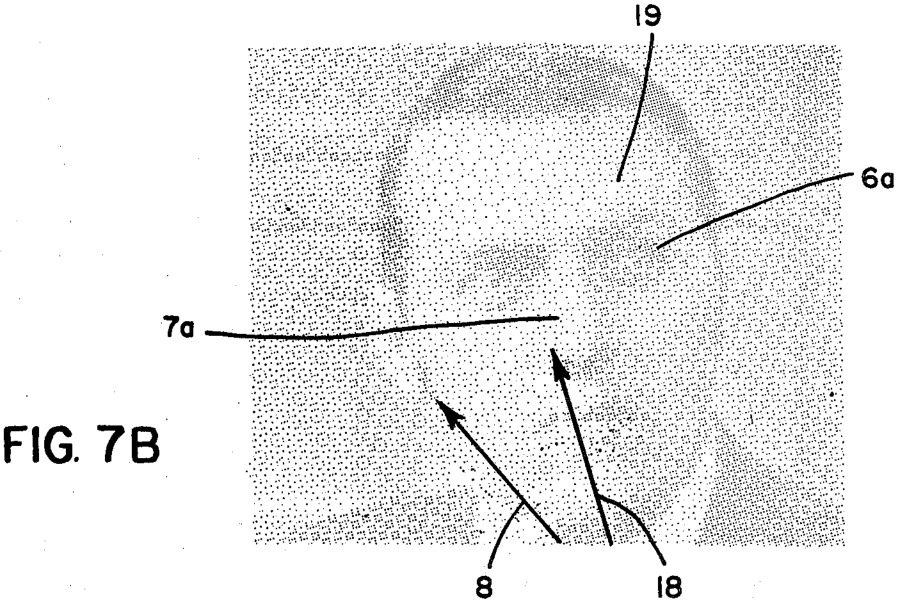
FIG. 7B illustrates an enlarged view of the undeveloped image in FIG. 7A indicating the remaining two angles in which the rows of dots representing the new position of the screen and the negative halftone extend and the resulting rosette pattern.

FIGS. 7A and 7B are views of what the undeveloped image produced from the second exposure would look like if developed, and if the first exposure had not already been made. FIG. 7A is the positive latent halftone which was produced on a separate piece of film (not film 16) to show the image produced from the interference of the halftone negative 1a and the dark screen 14' angled at 75° as shown by arrow 18 in FIG. 7. This is better illustrated by the enlargement of FIG. 7A as shown in FIG. 7B. The angle indicated by arrow 8, 45°, was produced from the halftone negative 1a as shown in FIG. 2A. The angle denoted by the arrow 18, 75°, was produced by the dark screen 14' which was angled to place its rows of openings at 75° as shown in FIG. 7. Film 16 is now developed and processed producing the final latent halftone, an enlarged portion of which is shown in FIG. 8.

Figure 8:
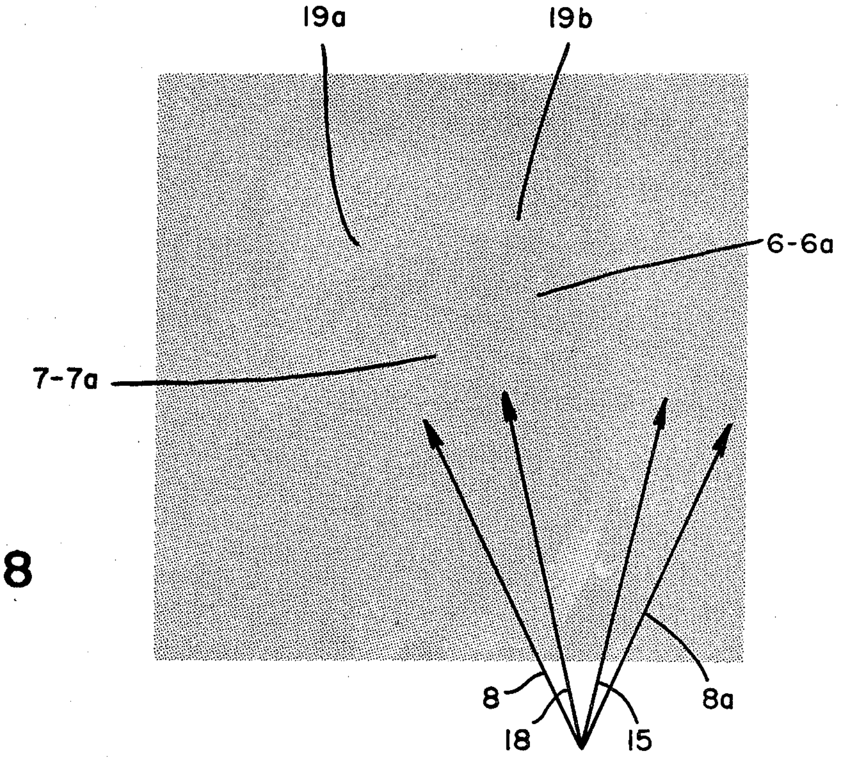
FIG. 8 is a combination of the negative in FIG. 6A and the positive in FIG. 7B illustrating the four angular directions of the rows of micro-dots and the final rosette pattern of the latent halftone.

In FIG. 8 the areas 6–6a, 7–7a, 19a, 19b are excellent illustrations of the visible circular pattern known as rosettes which was produced by combining the latent positive halftone which contains micro-dots angled at 45° and 75°, and the latent negative halftone which contains micro-dots angled at 45° and 105°. It should be noted that the visible rosette pattern is geometric in size and shape, and symmetrical, producing a negative and positive halftone that is invisible or latent.

Figure 8A:
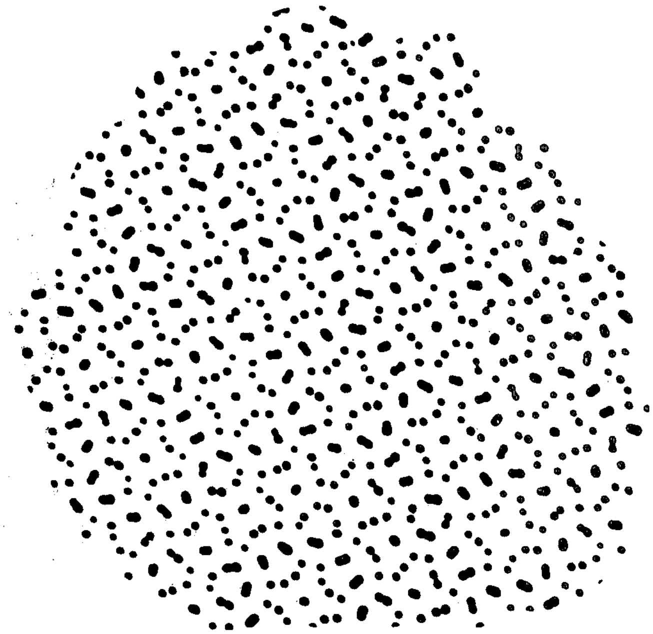
FIG. 8A is a major enlargement of the rosette pattern in FIG. 8.
Figure 8B:
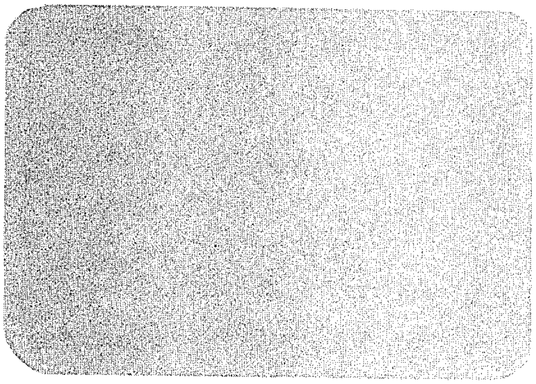
FIG. 8B is a print of the latent photograph at normal size.

FIG. 8A is an enlarged view of any area of FIG. 8 which shows the uniformity of the rosette pattern.

FIG. 8B is the latent halftone photograph at normal size. The size of the latent photograph can be either enlarged or reduced.

It should be noted that these halftone micro-dots angled at the two angles produce a geometric effect that is completely symmetrical. The negative latent halftone being the opposite of the positive halftone cancels the tonal values that would normally be visible if only the negative or the positive halftone was printed. The enlarged version shown in FIG. 8 does have some visible effect. This can normally be expected from a minor error in density between the negative and positive halftones. The drawings and prints were purposely produced at a higher contrast to enable the invention to be thoroughly described. In normal practice however, the tonal pattern is completely invisible. FIG. 8B is the latent halftone photograph at normal size. The latent halftone photograph can be reduced further to a very small size to enable imprinting on credit cards that are universal and are accepted by both creditors and the buying public. This reduction of the image can be accomplished due to the size of the small micro-dots in relationship to a normal halftone, which has dots much larger in size. The shadow or negative dots do not fill in or close up as in the case with a normal halftone.

Figure 9:
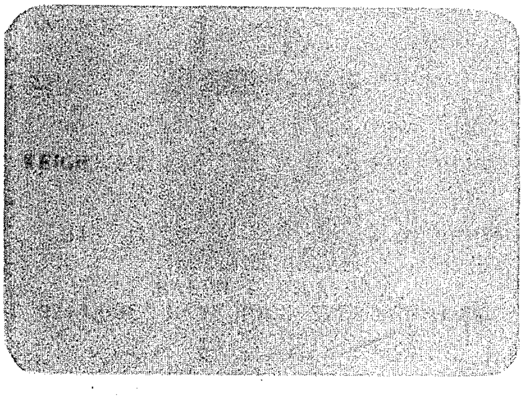
FIG. 9 illustrates the visible latent halftone or a projected image of the visible latent halftone.

FIG. 9 is either the visible latent halftone, or a projected image of the latent halftone, produced by combining a dark screen having openings smaller than those in screen 14, with the latent halftone photograph of FIG. 8B, and positioned relative to the latent positive halftone at the angle of 75°. This dark screen for producing the visible image is similar to the dark screen 14 or 14' except that its openings are reduced by at least 50% in diameter. This reduction of the diameter of the openings of the dark screen will overcome any dimensional difference between the material of the latent halftone and the material of the dark viewing screen.

During the past decade the use of credit cards as replacement for money has become widespread; with only a limited number of the cards having electronic or printing codes for use as personal identification. The reason for this being the ease in which the code can be copied or changed by a method called electronic skimming. The use of a visible photograph on the card is the most vulnerable to counterfeiting or tampering, since the photograph can easily be altered or even changed to the picture of the counterfeiter or forger.

It is one of the intents of this invention to provide a system of identification that is virtually foolproof as far as altering or changing the photograph that is used for identification. The dark screen 14 (and the viewing screen) can be fabricated from original art to prevent original duplication of a latent photograph. The small micro-dots of the latent halftone, which contains the total tonal range of the individual, are completely tamper proof since the visible picture can not be seen until placed on a viewer containing a dark screen. Further embodiments of this invention will be named below but should not be limited to the security or credit card field.

In FIG. 7B the positive latent halftone combined with the dark viewing screen will produce a visible positive halftone as seen in FIG. 9 but without the cancellation effect of the negative latent halftone. Since the tonal range is still slightly visible, the halftone could be reduced to a very small size making the image impossible to recognize. The use of a projector could be utilized to view the latent halftone at normal size again using the dark screen for viewing.

A further embodiment of the invention can be seen in FIG. 8 where the negative latent halftone is adjacent to or 30° from the positive latent halftone, using only two angles of the dark screen 14, 75° and 105°. The remaining two angles 45° and 90° could be utilized to produce a second latent halftone in the same square inch area. In this same vein the four angles, 45°, 75°, 90° and 105° could be used to photograph four different positive or negative halftones through the dark screen 14. These latent halftones can be viewed by turning the dark viewing screen to the angle of the halftone, producing only one halftone in the visible form while isolating the remaining three from view because of the 15° or 30° angle difference between them; therefore four latent images can be stacked one on top of the other on the same frame of film.

Still another way was discovered to produce a visible image of the latent image embodied in the developed film of FIG. 8B, which includes the above-noted rosette pattern. This was done by using a positive of the hidden or latent credit card image which included the rosette pattern (e.g. FIG. 8), photographing it to produce a negative, and then exposing this negative to an offset printing plate. From this plate printed samples of the credit card were made on an offset printing press. The image of the credit card on such printed sample was not visible. However, when a copy of the printed sample was made by way of a black and white xerographic process, the copy or "reproduction" reproduced the latent credit card image in a manner in which the rosette pattern was much darker than the original, to the extent that the hidden effect of the picture (credit card) was destroyed, and the picture became visible and darker, although not as perfectly visible as would be the case of using the screen and film as described in connection with FIG. 9.

The above-noted printed sample, when reproduced by way of a colored xerographic process resulted in a reproduction in which the now-visible credit card image was three times darker than in the case of the black and white copy.

The above-noted printed sample (with hidden credit card image) also defied reproduction by photography and printing. For example, the sample print was photographed, an offset printing plate was made from the resultant negative, and offset prints were made. The results were such that the negative became lighter, the printing plate darker, and the final printed sample (from original sample) became much darker, therefore making the formerly latent image visible.

It is believed that this "darkening" effect which occurs when efforts are made to reproduce the latent image in the manners noted above, results wherever a lens is employed to perform one of the reproduction steps. It is believed that the lens or lenses cause the dots of the rosette patterns to "join" or group together to destroy the original photographic range of light to dark, or small dots to large dots, that produced the hidden effect of the picture on the credit card. Thus another way of producing the hidden image disclosed herein is by attempting to reproduce it by conventional photographic and printing processes.

It will become apparent to those familiar with the art that further improvements of this invention would be too numerous to describe fully in this patent, and while I have illustrated and disclosed only some of my preferred embodiments of this invention, it is to be understood that since the various details of the process may obviously be varied considerable without really departing from the basic principles and teachings of this invention, I do not limit myself to the precise process herein disclosed and the right is specifically reserved to encompass all changes and modifications coming within the scope of the invention as defined in the appended claims.

Having thus described my invention, what I claim is:

1. A method of producing an invisible latent photograph which is viewable with the aid of a suitable dark screen comprising using a reproduction of the photograph in both negative and positive form, micro halftone photographing both negative and positive forms of said photograph in sequence and in register onto suitable film or paper through a dark screen, having extremely small apertures and angled 30° and 60° in respect to the upper margin thereof, respectively, the resulting latent photograph, having a visual effect of being smooth and continuous is a reflection of the size and shape of the dots, tones, or lines of both positive and negative reproductions, but reduced in size and changed in shape by the small apertures of the dark screen, when thus photographed at two angles 30° apart; the latent photographs obtained reflect only the positive end of the photographic scale, and then only in percentages of from 1/10 of a percent to 5 percent representing the dots, tones or lines of the positive and negative reproductions which varied in percentages of from 1% to 59% being positive in nature and from 60% to 99% being negative in nature; the visible tonal range of the latent photographs are rendered invisible or latent in form by the cancellation effect of the negative and positive micro-halftones photographed through said screen turned 30° from each other during said photographing, to view or see the latent halftones, negative or positive, a dark screen similar to one that produced the latent halftone is placed over the film, or paper containing the latent halftones, and then turned to the appropriate angle, producing a visible halftone of the negative latent image in one case and a visible halftone of the positive latent image in the other; the visible halftones then, are a reflective match of the original reproductions, when in reality the dots, tones, or lines on the original reproduction had both negative and positive aspects, with percentages of from 1% to 99% whereas the combination of the latent halftone and the dark screen reflects only negative aspects, with percentages of from 95% to 99 9/10%.

2. A method in accordance with claim 1, but using only the positive latent halftone and the dark viewing screen to produce a visible positive halftone.

3. A method in accordance with claim 1, but using only the negative latent halftone and the dark viewing screen to produce a visible negative halftone.

4. A method in accordance with claim 1, but using two or more positive or negative halftones and the dark viewing screen to produce two or more visible positive or negative halftones.

5. A method in accordance with claim 1, but reducing the latent halftones to a smaller size.

6. A method in accordance with claim 1, using a projector to enlarge the reduced image onto a dark viewing screen at the same periodicity as that as the latent halftone.

7. A viewing method used in accordance with claim 1, but with the openings of the dark screen reduced by at least 50% in diameter as that of the openings of the dark screen used to produce the latent halftones.

8. A method in accordance with claim 1, using a continuous tone negative and positive reproduction with the dark screen angled at 30° from each other to produce the latent halftone negative and the latent halftone positive.

9. A method in accordance with claim 1, using a random negative and positive reproduction with the dark screen angled 30° from each other, to produce a latent positive and negative halftone.

10. A method in accordance with claim 1, using a negative continuous tone reproduction and the dark screen to produce negative latent halftone.

11. A method in accordance with claim 1, using the positive continuous tone reproduction and the dark screen to produce a negative latent halftone.

12. A method in accordance with claim 1, using the positive continuous tone reproduction and the dark screen and positive reacting film or paper to produce a positive halftone having percentages of from 95% to 99% reflecting the total range of the positive continuous reproduction.

13. A method of photographically producing a latent image suitable for use in connection with an identification card comprising the steps of preparing positive and negative halftone reproductions of said image in sequence and in register by photographing said positive and negative reproductions of said image through a screen having a plurality of extremely small apertures therein, and separating said halftone images by an angle of 30° relative to each other to render the visible halftones invisible when viewed without the aid of a screen having smaller apertures than said first-mentioned screen placed thereover.

14. An invisible latent image of a person, signature, and the like adapted to be affixed to an identification card comprising positive and negative micro-dot halftone photographic reproductions taken through a screen having a plurality of extremely small apertures therein and arranged at 30° phase relative to each other so as to be invisible to the unaided eye and viewable with the aid of a screen having a plurality of much smaller apertures than the apertures of said first-mentioned screen and turned at a suitable angle relative to said image.

15. A method of producing on a substrate a latent image of an object which appears to be invisible to the unaided eye, comprising photographing the object through a halftone screen to produce at least one halftone image of the object, placing said halftone image in registry with a strip of light sensitive film and a dark screen having therein a plurality of extremely small apertures arranged in parallel rows oriented in predetermined angular offset relation to the rows of halftone dots forming said halftone image, exposing said strip of film to said halftone image through the small openings in said screen, developing the exposed film to produce thereon the latent image of said object, and imprinting said latent image on said substrate.

16. A method as defined in claim 15, including producing both positive and negative halftone images of said object, and superposing said positive and negative halftone images onto said strip of light sensitive film by successively exposing the film to said halftone images through said dark screen with the rows of apertures in said screen being oriented in a first predetermined direction during exposure of said film to one of said halftone images and oriented in a second direction different from said first direction during exposure of said film to the other of said halftone images.

17. A method as defined in claim 16, wherein during each exposure of said strip of film said screen is positioned so that its rows of apertures are offset up to 30° from the rows of halftone dots defining the halftone image then being exposed to said strip, and said first and second directions in which said rows of apertures are oriented are angularly spaced up to 30° from each other.

18. An article having printed on the face thereof a latent image of an object which appears to be invisible to the unaided eye, said image comprising a microdot reproduction of a photograph of a halftone image of said object taken through a dark screen having therein a plurality of parallel rows of extremely small apertures arranged at an acute angle to the rows of halftone dots defining said halftone image.

* * * * *

UNITED STATES PATENT AND TRADEMARK OFFICE

CERTIFICATE OF CORRECTION

PATENT NO. : 4,143,967 Page 1 of 2

DATED : 13 March 1979

INVENTOR(S) : Ralph C. Wicker

It is certified that error appears in the above-identified patent and that said Letters Patent are hereby corrected as shown below:

The title page should be deleted to insert the attached title page therefor.

Signed and Sealed this

***Nineteenth* Day of *June 1979***

[SEAL]

*Attest:*

RUTH C. MASON
*Attesting Officer*

DONALD W. BANNER
*Commissioner of Patents and Trademarks*

United States Patent [19]

Wicker

[11] 4,143,967

[45] Mar. 13, 1979

[54] LATENT PHOTO SYSTEM

[75] Inventor: Ralph C. Wicker, Rush, N.Y.

[73] Assignee: Benjamin J. Haggquist, Fairport, N.Y. ; a part interest

[21] Appl. No.: 910,639

[22] Filed: May 30, 1978

Related U.S. Application Data

[63] Continuation-in-part of Ser. No. 710,300, Jul. 30, 1976, abandoned.

[51] Int. Cl.² .................... G03B 27/32; B41M 1/14; B42D 15/00; G03B 27/68

[52] U.S. Cl. .................... 355/77; 101/211; 283/6; 355/52; 355/71

[58] Field of Search .............. 101/211; 283/6, 7, 8 B; 355/52, 77, 71

[56] References Cited

U.S. PATENT DOCUMENTS

| | | | |
|---|---|---|---|
| 1,285,753 | 11/1918 | Löwenstein | 283/6 UX |
| 1,762,711 | 6/1930 | Casto | 101/211 |
| 2,798,428 | 7/1957 | Tollenaar | 101/211 |
| 2,952,080 | 9/1960 | Avakian et al. | 283/6 UX |
| 3,048,697 | 8/1962 | Cavanaugh et al. | 283/6 UX |
| 3,109,239 | 11/1963 | Wicker et al. | 101/211 X |
| 3,609,035 | 9/1971 | Ataka | 355/77 X |
| 3,640,009 | 2/1972 | Komiyama | 283/7 X |
| 3,675,948 | 7/1972 | Wicker | 283/6 |

*Primary Examiner*—Richard A. Wintercorn
*Attorney, Agent, or Firm*—Shlesinger, Fitzsimmons & Shlesinger

[57] ABSTRACT

A method of producing a latent photograph by using a reproduction of the photograph in both negative and positive form, photographing both negative and positive in sequence and in register through a dark screen, having extremely small apertures and angled 30° and 60° in respect to the upper margin, the resulting latent photograph having a visual effect of being smooth and continuous is a reflection of the size and shape of the dots, lines, or tones, of both positive and negative reproductions, but reduced in size and changed in shape by the small apertures of the dark screen when photographed at two angles 30° apart through the negative and positive reproductions; the latent photographs reflect only the positive end of the photographic scale and then only in percentages of from 1/10 of a percent to 5 percent representing the dots, lines, or tones of the positive and negative reproductions which varied in percentages of from 1% to 59% being positive in nature and from 60% to 99% being negative in nature; the visible tonal range of the latent photographs are rendered invisible or latent in form by the cancellation effect of the negative and positive dots, tones, or lines photographed next to or 30° from each other; to view or see the latent photographs negative or positive, the dark screen is placed over the latent picture and turned to the appropriate angle, producing a visible photo of the negative in one case and a visible photo of the positive in the other; the visible photographs are a reflective match of the original reproductions, when in reality the dots, lines, or tones on the original reproductions, had both negative and positive aspects, with percentages of from 1% to 99% whereas the combination of the latent photograph and the dark screen reflects only negative aspects with percentages of from 95% to 99 9/10%.

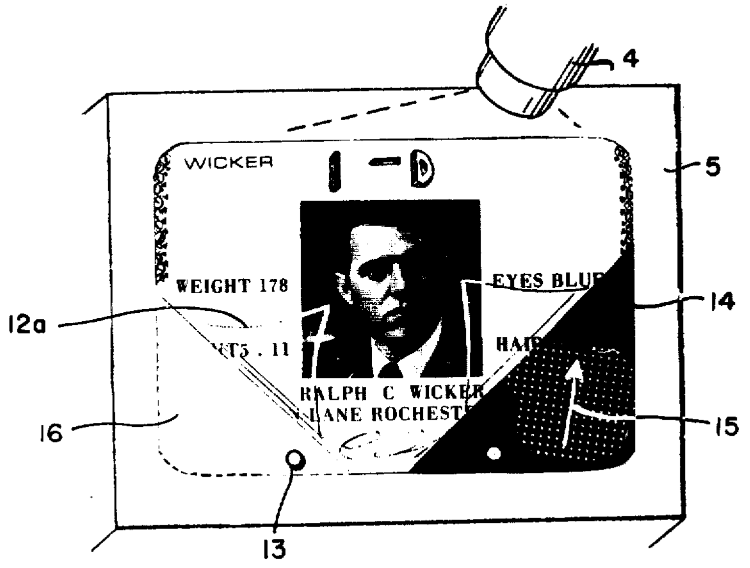

18 Claims, 18 Drawing Figures